United States Patent [19]

Ting

[11] E Re. 30,236

[45] Reissued Mar. 25, 1980

[54] CLEAN SPARK IGNITION INTERNAL COMBUSTION ENGINE

[76] Inventor: Hui-Tzeng Ting, Apartment 306, 290 Potter Pl., Weehawken, N.J. 07087

[21] Appl. No.: 904,753

[22] Filed: May 11, 1978

Related U.S. Patent Documents

Reissue of:

[64] Patent No.: 4,036,187
Issued: Jul. 19, 1977
Appl. No.: 667,409
Filed: Mar. 16, 1976

U.S. Applications:

[63] Continuation-in-part of Ser. No. 376,304, Jul. 5, 1973, abandoned.

[51] Int. Cl.[2] ..... F02B 19/10
[52] U.S. Cl. ..... 123/32 SP; 123/32 E
[58] Field of Search ..... 123/32 ST, 32 SP, 32 E, 123/191 S, 191 ST

[56] References Cited

U.S. PATENT DOCUMENTS

| | | | |
|---|---|---|---|
| 1,537,748 | 5/1925 | Cole | 123/32 ST |
| 2,156,665 | 5/1939 | Mallory | 123/32 ST |
| 3,079,901 | 3/1963 | Hallberg | 123/32 SP |
| 3,166,051 | 1/1965 | Hallberg | 123/32 SP |
| 3,318,292 | 5/1967 | Hideg | 123/32 ST |
| 3,504,681 | 4/1970 | Winkler | 123/32 SP |
| 3,621,821 | 11/1971 | Jarnuszkiewicz | 123/32 ST |
| 3,937,188 | 2/1976 | Wrigley | 123/32 ST |

*Primary Examiner*—Ronald B. Cox
*Attorney, Agent, or Firm*—Stuart S. Bowie

[57] ABSTRACT

A two or four-stroke spark ignition engine has fuel injectors located at or near BDC, and a separate recess in its cylinderhead to trap a lean mixture for causing more complete combustion of a rich mixture outside the recess after the rich mixture is ignited.

18 Claims, 5 Drawing Figures

FIG. 2A
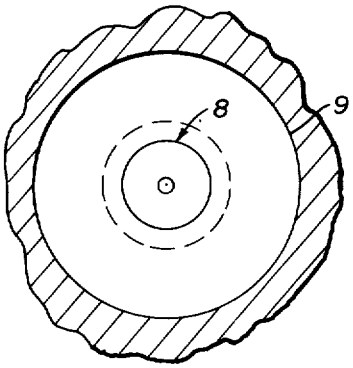
FIG. 2B
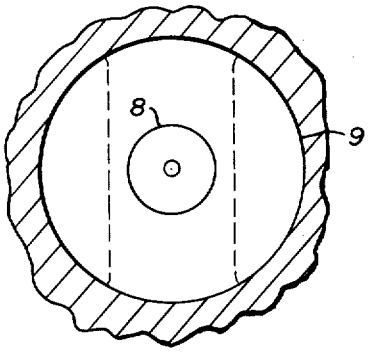
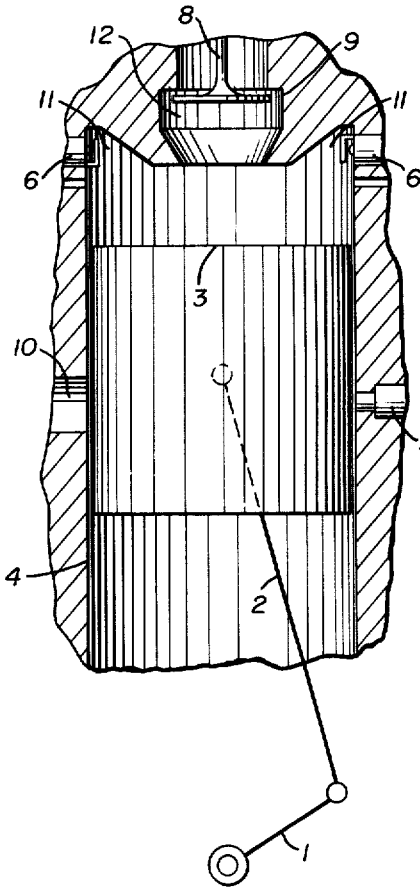
FIG. 2

CLEAN SPARK IGNITION INTERNAL COMBUSTION ENGINE

Matter enclosed in heavy brackets [ ] appears in the original patent but forms no part of this reissue specification; matter printed in italics indicates the additions made by reissue.

This application is a continuation-in-part of my former application Ser. No. 376,304, filed 7-5-73, now abandoned.

My invention is a renovation of the existing and successful Honda CVCC four-stroke spark ignition engine which employs two inlet valves to admit lean and rich air-fuel mixtures from two separate carburetors to the cylinder. The cylinderhead of said Honda engine has a recess to accommodate the inlet valve for rich mixture, and is so shaped as to keep the rich mixture from being completely mixed with the lean mixture outside the recess and in the cylinder. Thus two separate pockets of lean and rich mixtures are formed at the end of compression stroke when the rich mixture inside the said recess is ignited by a spark plug. When the rich mixture is being burnt during the expansion stroke, the lean mixture outside the said recess will also be burnt when the flame front reaches it. The entry of lean mixture into combustion after the ignition of rich mixture by the spark plug promotes complete combustion and reduces air pollution.

The novelty of said Honda engine is the combination of the following features.

1. one additional inlet valve,
2. one additional carburetor, and
3. one separate recess in the cylinderhead to keep the lean mixture from being completely mixed with the rich mixture before ignition takes place. The disadvantages of said Honda engine as compared with conventional four-stroke spark ignition engines are as follows.

1. It is more expensive because of the additional inlet valve and its related mechanism.

2. It is more expensive because of the additional carburetor.

3. As compared with the simple compact such as hemispherical cylinderhead of a conventional engine, the recessed cylinderhead of said Honda engine has larger surface area to lose heat and thus reduce efficiency. Also the length of flame path from the spark plug to the remotest point of cylinderhead is longer, and thus the tendency of detonation is larger with said Honda engine.

Figure 1:
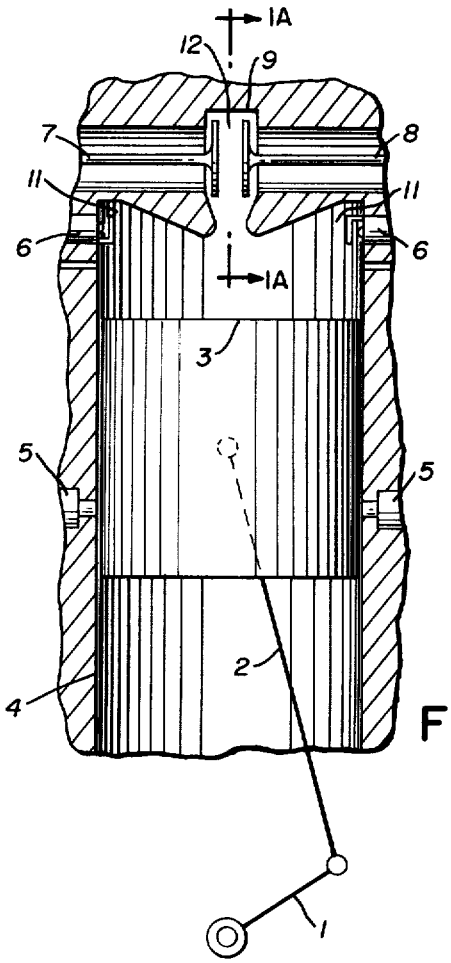
Figure 1A:
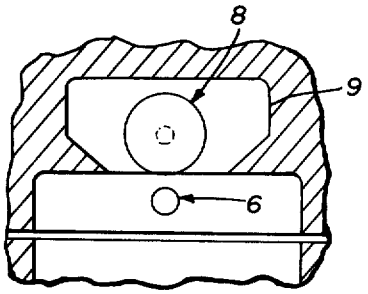

My invention is a renovation of said Honda engine. As shown in the FIGS. 1 and 2 of the schematic diagram of four-stroke and two-stroke engines respectively, the elements are numbered as follows.

1=crankshaft
2=connecting rod
3=piston
4=cylinder
5=fuel injector
6=spark plugs
7=suction valve
8=exhaust valve
9=cylinderhead
10=scavenging port
11=first chamber
12=second chamber, also called a recess There may be one or more fuel injectors and spark plugs, depending on the size of the engine. The cylinderhead is divided into two chambers, namely the first chamber and the second chamber. The first chamber is located on top of the cylinder, and the second chamber is attached to the first chamber from the top, and looks like a separate recess in the cylinderhead. The spark plugs are located in the first chamber, and the inlet and exhaust valve are located in the second chamber.

My invention covers the four-stroke and the two-stroke cycle spark ignition internal combustion engines using gasoline or similar fuels. Fuel is injected when the piston is at or near its bottom dead center or the end of the suction stroke. Also an extra lean mixture of pure air is sucked into the cylinder through an intake valve in the case of a four-stroke engine, or through the scavenging port in the case of a two-stroke engine. The working modes of the engines of my invention are similar to that of said Honda engine except the feature of injecting fuel directly into the cylinder when the piston is at or near its bottom dead center or the end of the suction stroke. This causes a layer of rich air-fuel mixture at the top of the piston where the heat of the piston can quickly evaporate the fuel. As the piston travels in its compression stroke, the turbulence will cause further mixing of air and fuel. If there were enough time for such mixing, the air-fuel mixture would become homogeneous throughout the cylinder. In a real engine, however, the time interval for said compression stroke is extremely short. Therefore, the said mixing cannot be thorough, and the mixture at the top of the piston is richer than the mixture at the cylinderhead when the piston is near its top dead center, or when the ignition starts. Furthermore, the lean mixture in the said second chamber will remain relatively lean as has been proved in said Honda engine due to the fact that the said second chamber is a recess so as to keep the lean mixture from being completely mixed with the rich mixture in the said first chamber. The spark plugs are located in the first chamber, and are near the piston top when the piston reaches said top dead center. Therefore, when the spark plugs give ignition, the mixture surrounding them is rich enough to get ignited. Then the lean mixture trapped in the said second chamber is ignited as the flame front reaches there, and its excessive air will mix with the unburnt rich mixture and burn it more completely due to the violent turbulence and high temperature generated during the explosion. Such a working mode has been proved successful in said Honda engine. Although the working mode of my invention is similar to that of said Honda engine, the equipments employed and their combination are different.

I claim:

1. In a four-stroke spark ignition engine having fuel injectors in the cylinder wall and a combustion chamber in the cylinderhead, the stratification of air-fuel mixture is obtained by the combined employment and unique arrangement of such devices as said combustion chamber which is divided into two separate chambers, the first chamber being bounded by the piston top at or near top dead center, the lower part of the cylinder-head, and a throat opening leading to the second chamber which is located on top of said first chamber; the inlet and exhaust valves which are located in said second chamber; the fuel injector or injectors which are located at or near the bottom dead center, and create atomized fuel droplets covering the vicinity of the piston top when injection takes place at the bottom dead center; and the spark plug or plugs which are located at or near the bottom of said first chamber, such that said stratification of air-fuel mixture is obtained with the rich mixture at or near the piston top during the end of intake stroke, and said stratification is maintained throughout the ensuing compression stroke due to the fact that the time interval of said compression stroke is extremely short as compared with the time required by natural diffusion or turbulence to undo said stratification such that at the instant of ignition a lean mixture is trapped in said second chamber, and a rich mixture is trapped in said first chamber where said spark plug or plugs give ignition to said rich mixture first, and the ignited mixture will reach more complete combustion later during the expansion stroke by mixing with the lean mixture released from said second chamber.

2. In a two-stroke spark ignition engine having fuel injectors in the cylinder wall and a combustion chamber in the cylinderhead, the stratification of air-fuel mixture is obtained by the combined employment and unique arrangement of such devices as said combustion chamber which is divided into two separate chambers, the first chamber being bounded by the piston top at or near the top dead center, the lower part of the cylinder-head, and a throat opening leading to the second chamber which is located on top of said first chamber; the exhaust valve which is located in said second chamber; the fuel injector or injectors which are located at or near the bottom dead center, and create atomized fuel droplets covering the vicinity of the piston top when injection takes plate at the bottom dead center; and the spark plug or plugs which are located at or near the bottom of said first chamber, such that said stratification of air-fuel mixture is obtained with the rich mixture at or near the piston top during the end of scavenging, and said stratification is maintained throughout the ensuing compression stroke due to the fact that the time interval of said compression stroke is extremely short as compared with the time required by natural diffusion or turbulence to undo said stratification such that at the instant of ignition a lean mixture is trapped in said second chamber, and a rich mixture is trapped in said first chamber where said spark plug or plugs give ignition to said rich mixture first, and the ignited mixture will reach more complete combustion later during the expansion stroke by mixing with the lean mixture released from said second chamber.

3. In a four-stroke spark ignition engine, according to claim 2, said first and second combustion chambers are concentrical to each other.

4. In a two-stroke spark ignition engine, according to claim 2, said first and second combustion chambers are concentrical to each other.

*5. In a spark ignition engine having means for fuel injection, a piston, a cylinder including a cylinder head, means for obtaining statification of the air-fuel mixture comprising:*

*(a) a combustion zone having main and auxiliary combustion chambers;*

*(i) the main combustion chamber being bounded by the piston top at or near top dead center, a part of the cylinder head and a throat leading to the auxiliary combustion chamber;*

*(ii) an auxiliary combustion chamber affixed to the engine and located adjacent the side of said main chamber and communicating by said throat therewith, said auxiliary chamber being a nonmoving part of the engine;*

*(b) reciprocating inlet means for introducing air into the combustion zone and exhaust means for evacuating the gases from the cylinder after combustion;*

*(c) fuel injector means for injecting fuel into a layer at or near the piston top when the piston is at or near bottom dead center to create a fuel-rich layer at the vicinity of the piston top at the end of intake stroke so as to provide a fuel-rich parcel in said main chamber later at the end of compression stroke;*

*(d) spark means for igniting the said fuel-rich parcel created in the said main combustion chamber when the piston is at or near the top dead center,*

*whereby combustion begins in said main combustion chamber and receives a secondary air supply from said auxiliary combustion chamber.*

*6. The invention of claim 5 wherein the engine is a four-stroke engine.*

*7. The invention of claim 6 wherein the fuel injector means is located at or near the bottom dead center.*

*8. The invention of claim 6 wherein the spark means is located in the main combustion chamber.*

*9. The invention of claim 6 wherein the inlet means and exhaust means are located at the auxiliary combustion chamber.*

*10. The invention of claim 5 wherein the engine is a two-stroke engine.*

*11. The invention of claim 10 wherein the fuel injector means is located at or near the bottom dead center.*

*12. The invention of claim 10 wherein the spark means is located in the main combustion chamber.*

*13. The invention of claim 10 wherein the exhaust means is in the auxiliary combustion chamber and the inlet means is in the cylinder.*

*14. In a two or four stroke spark ignition engine having a piston, reciprocating intake means, means for fuel injection, a cylinder including a cylinder head, a combustion zone located in the cylinder and having main and auxiliary combustion chambers; and auxiliary combustion chamber being located farther from the piston top than the main combustion chamber and affixed to the engine as a nonmoving part thereof; said auxiliary chamber communicating with said main chamber through a throat; a method of forming a stratified charge of air-rich and fuel-rich parcels and combusting the same comprising the steps of:*

*(a) injecting fuel into a layer at or near the piston top when the piston is at or near bottom dead center to create a fuel-rich parcel at the vicinity of the piston top within the main chamber;*

*(b) drawing an air-rich parcel into the auxiliary combustion chamber;*

*(c) and igniting the said fuel-rich parcel created in the main chamber when the piston is at or near top dead center so that combustion begins in said main combustion chamber and receives a secondary air supply from said auxiliary combustion chamber.*

*15. In a four-stroke spark ignition engine having means for fuel injection, a piston, a cylinder including a cylinder head and an engine frame, means for obtaining stratification of the air-fuel mixture, comprising:*

*(a) a combustion zone having main and auxiliary combustion chambers connected to each other through a throat opening;*

*(i) the main chamber being bounded by the piston top at or near the top dead center, a part of the cylinder head and a throat opening leading to the auxiliary chamber;*

*(ii) an auxiliary combustion chamber located adjacent to said main combustion chamber and affixed*

*to the engine frame in a non-movable relationship to the engine frame and communicating by said throat with said main chamber;*

*(b) intake means including reciprocating intake valve means an intake manifold for introducing air into the cylinder and exhaust means for evacuating the gases from the cylinder after combustion;*

*(c) fuel injection means located at or near the bottom dead center for producing fuel-rich parcel covering the piston top;*

*(d) spark means located in the said main combustion chamber.*

*16. The invention of claim 15, wherein the intake and exhaust means are located in the auxiliary combustion chamber.*

*17. The invention of claim 15, wherein the intake means is located in the auxiliary combustion chamber.*

*18. The invention of claim 15, wherein the exhaust means is located in the auxiliary combustion chamber.*

* * * * *